United States Patent
Dey, IV et al.

(10) Patent No.: US 11,014,224 B2
(45) Date of Patent: May 25, 2021

(54) VIBRATION REDUCTION SYSTEM AND METHOD FOR POWER TOOLS

(71) Applicant: Milwaukee Electric Tool Corporation, Brookfield, WI (US)

(72) Inventors: John S. Dey, IV, Milwaukee, WI (US); Jacob P. Schneider, Madison, WI (US); Matthew J. Mergener, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 190 days.

(21) Appl. No.: 15/397,913

(22) Filed: Jan. 4, 2017

(65) Prior Publication Data

US 2017/0190041 A1 Jul. 6, 2017

Related U.S. Application Data

(60) Provisional application No. 62/275,107, filed on Jan. 5, 2016.

(51) Int. Cl.
*B25D 17/24* (2006.01)
*B25F 5/00* (2006.01)
*F16F 9/53* (2006.01)

(52) U.S. Cl.
CPC ............ *B25F 5/006* (2013.01); *B25D 17/245* (2013.01); *F16F 9/535* (2013.01); *B25D 2217/0073* (2013.01); *F16F 2222/06* (2013.01)

(58) Field of Classification Search
CPC .......... B25F 5/006; B25F 5/00; B25D 17/245; B25D 2217/0073; F16F 9/535; F16F 2222/06; B23D 49/162; B23D 51/16

(Continued)

(56) References Cited

U.S. PATENT DOCUMENTS 2,980,218 A 4/1961 Young
3,619,750 A 11/1971 Mokrytzki
(Continued)

FOREIGN PATENT DOCUMENTS

CN 103962883 A * 8/2014 ............ B23Q 11/00
DE 10029132 1/2002
(Continued)

OTHER PUBLICATIONS

International Search Report and Written Opinion for Application No. PCT/US2017/012093 dated Apr. 12, 2017 (14 pages).
(Continued)

*Primary Examiner* — Robert F Long
(74) *Attorney, Agent, or Firm* — Michael Best & Friedrich LLP

(57) ABSTRACT

Systems and methods for reducing vibration in power tool. One system includes a power tool that includes a housing and a motor. The power tool further includes a magnetically susceptible fluid located within the housing. The power tool further includes an inductor configured to introduce a magnetic field to the magnetically susceptible fluid. The power tool further includes a sensor configured to indicate an amount of vibration experienced by the power tool. The power tool further includes an electronic processor coupled to the sensor and to the inductor. The electronic processor is configured to receive an input signal from the sensor indicating the amount of vibration, to generate a control signal based on the input signal, and to provide the control signal to the inductor to control the magnetic field.

7 Claims, 12 Drawing Sheets

(58) Field of Classification Search
USPC .... 173/2, 114, 117, 118, 201–204, 121, 212, 173/176, 132, 48, 104, 109, 217
See application file for complete search history.

(56) References Cited

U.S. PATENT DOCUMENTS

| | | | |
|---|---|---|---|
| 3,739,659 A | 6/1973 | Workman, Jr. | |
| 3,882,305 A | 5/1975 | Johnstone | |
| 3,965,778 A | 6/1976 | Aspers et al. | |
| 4,545,106 A | 10/1985 | Juengel | |
| 4,628,459 A | 12/1986 | Shinohara et al. | |
| 4,680,862 A | 7/1987 | Wieland et al. | |
| 4,685,050 A | 8/1987 | Polzer et al. | |
| 4,854,786 A | 8/1989 | Alexander et al. | |
| 4,881,435 A | 11/1989 | Hansson | |
| 4,893,067 A | 1/1990 | Bhagwat et al. | |
| 4,903,187 A | 2/1990 | Doi et al. | |
| 5,140,529 A * | 8/1992 | Peifer | F16C 32/044 310/51 |
| 5,154,242 A | 10/1992 | Soshin et al. | |
| 5,203,242 A | 4/1993 | Hansson | |
| 5,277,261 A | 1/1994 | Sakoh | |
| 5,315,501 A | 5/1994 | Whitehouse | |
| 5,526,460 A | 6/1996 | DeFrancesco et al. | |
| 5,698,823 A | 12/1997 | Tanahashi | |
| 5,731,673 A | 3/1998 | Gilmore | |
| 5,731,681 A | 3/1998 | Inaniwa et al. | |
| 5,903,462 A | 5/1999 | Wagner et al. | |
| 5,942,975 A | 8/1999 | Sørensen | |
| 5,963,706 A | 10/1999 | Baik | |
| 6,120,363 A | 9/2000 | Dunn | |
| 6,123,241 A | 9/2000 | Walter et al. | |
| 6,157,313 A | 12/2000 | Emmermann | |
| 6,161,629 A | 12/2000 | Hohmann et al. | |
| 6,279,668 B1 | 8/2001 | Mercer | |
| 6,405,598 B1 | 6/2002 | Bareggi | |
| 6,424,799 B1 | 7/2002 | Gilmore | |
| 6,431,425 B1 | 8/2002 | Moorman et al. | |
| 6,508,313 B1 | 1/2003 | Carney et al. | |
| 6,520,270 B2 | 2/2003 | Wissmach et al. | |
| 6,522,949 B1 | 2/2003 | Ikeda et al. | |
| 6,536,536 B1 | 3/2003 | Gass et al. | |
| 6,546,443 B1 | 4/2003 | Kushida | |
| 6,598,684 B2 | 7/2003 | Watanabe | |
| 6,636,011 B2 | 10/2003 | Sadasivam et al. | |
| 6,668,212 B2 | 12/2003 | Colangelo, II et al. | |
| 6,687,567 B2 | 2/2004 | Watanabe | |
| 6,731,082 B2 | 5/2004 | Pelonis | |
| 6,784,801 B2 | 8/2004 | Watanabe et al. | |
| 6,799,644 B2 * | 10/2004 | Hoop | B25D 17/06 173/176 |
| 6,834,730 B2 | 12/2004 | Gass et al. | |
| 6,836,614 B2 | 12/2004 | Gilmore | |
| 6,848,516 B2 | 2/2005 | Giardino | |
| 6,872,121 B2 | 3/2005 | Wiener et al. | |
| 6,913,087 B1 | 7/2005 | Brotto et al. | |
| 6,923,285 B1 | 8/2005 | Rossow et al. | |
| 6,938,689 B2 | 9/2005 | Farrant et al. | |
| 6,945,337 B2 | 9/2005 | Kawai et al. | |
| 6,954,048 B2 | 10/2005 | Cho | |
| 6,968,908 B2 | 11/2005 | Tokunaga et al. | |
| 6,978,846 B2 | 12/2005 | Kawai et al. | |
| 7,034,711 B2 | 4/2006 | Sakatani et al. | |
| 7,035,710 B2 | 4/2006 | Balling | |
| 7,035,898 B1 | 4/2006 | Baker | |
| 7,036,612 B1 * | 5/2006 | Raymond | E21B 17/07 175/320 |
| 7,036,703 B2 | 5/2006 | Grazioli et al. | |
| 7,062,998 B2 | 6/2006 | Hohmann et al. | |
| 7,064,462 B2 * | 6/2006 | Hempe | B23D 45/16 173/217 |
| 7,064,502 B2 | 6/2006 | Garcia et al. | |
| 7,086,483 B2 | 8/2006 | Arimura et al. | |
| 7,102,303 B2 | 9/2006 | Brotto et al. | |
| 7,112,934 B2 | 9/2006 | Gilmore | |
| 7,123,149 B2 | 10/2006 | Nowak et al. | |
| 7,137,541 B2 | 11/2006 | Baskar et al. | |
| 7,158,837 B2 | 1/2007 | Osypka et al. | |
| 7,211,972 B2 | 5/2007 | Garcia et al. | |
| 7,218,227 B2 | 5/2007 | Davis et al. | |
| 7,243,440 B2 | 7/2007 | DeKeyser | |
| 7,314,097 B2 | 1/2008 | Jenner et al. | |
| 7,328,086 B2 | 2/2008 | Perry et al. | |
| 7,328,752 B2 | 2/2008 | Gass et al. | |
| 7,328,757 B2 | 2/2008 | Davies | |
| 7,343,764 B2 | 3/2008 | Solfronk | |
| 7,346,422 B2 | 3/2008 | Tsuchiya et al. | |
| 7,359,762 B2 | 4/2008 | Etter et al. | |
| 7,382,272 B2 | 6/2008 | Feight | |
| 7,404,449 B2 * | 7/2008 | Bermingham | E02D 13/06 173/128 |
| 7,419,013 B2 | 9/2008 | Sainomoto et al. | |
| 7,428,934 B2 | 9/2008 | Arimura | |
| 7,437,204 B2 | 10/2008 | Lev-Ami et al. | |
| 7,464,769 B2 | 12/2008 | Nakazawa et al. | |
| 7,501,778 B2 | 3/2009 | Hashimoto et al. | |
| 7,518,837 B2 | 4/2009 | Tseng et al. | |
| 7,540,334 B2 | 6/2009 | Gass et al. | |
| 7,613,590 B2 | 11/2009 | Brown | |
| 7,646,155 B2 | 1/2010 | Woods et al. | |
| RE41,185 E | 3/2010 | Gilmore et al. | |
| 7,690,569 B2 | 4/2010 | Swanson et al. | |
| 7,750,811 B2 | 7/2010 | Puzio et al. | |
| 7,787,981 B2 | 8/2010 | Austin et al. | |
| 7,795,829 B2 | 9/2010 | Seiler et al. | |
| 7,809,495 B2 | 10/2010 | Leufen | |
| 7,817,062 B1 | 10/2010 | Li et al. | |
| 7,823,458 B2 | 11/2010 | Kibblewhite et al. | |
| 7,834,566 B2 | 11/2010 | Woods et al. | |
| 7,868,591 B2 | 1/2011 | Phillips et al. | |
| 7,898,403 B2 | 3/2011 | Ritter et al. | |
| 7,900,524 B2 | 3/2011 | Calloway et al. | |
| 7,911,379 B2 | 3/2011 | Cameron | |
| 7,928,673 B2 | 4/2011 | Woods et al. | |
| 7,931,096 B2 | 4/2011 | Saha | |
| 7,942,084 B2 | 5/2011 | Wilson, Jr. et al. | |
| 7,942,211 B2 | 5/2011 | Scrimshaw et al. | |
| 7,953,965 B2 | 5/2011 | Qin et al. | |
| 7,982,624 B2 | 7/2011 | Richter et al. | |
| 8,004,397 B2 | 8/2011 | Forrest et al. | |
| 8,004,664 B2 | 8/2011 | Etter et al. | |
| 8,005,647 B2 | 8/2011 | Armstrong et al. | |
| 8,022,654 B2 | 9/2011 | Zhao et al. | |
| 8,044,796 B1 | 10/2011 | Carr, Sr. | |
| 8,049,636 B2 | 11/2011 | Buckingham et al. | |
| 8,074,731 B2 | 12/2011 | Iwata et al. | |
| 8,169,298 B2 | 5/2012 | Wiesner et al. | |
| 8,171,828 B2 | 5/2012 | Duvan et al. | |
| 8,179,069 B2 | 5/2012 | Matsunaga et al. | |
| 8,210,275 B2 | 7/2012 | Suzuki et al. | |
| 8,255,358 B2 | 8/2012 | Ballew et al. | |
| 8,260,452 B2 | 9/2012 | Austin et al. | |
| 8,264,374 B2 | 9/2012 | Obatake et al. | |
| 8,281,871 B2 | 10/2012 | Cutler et al. | |
| 8,286,723 B2 | 10/2012 | Puzio et al. | |
| 8,294,424 B2 | 10/2012 | Bucur | |
| 8,310,206 B2 | 11/2012 | Bucur | |
| 8,316,958 B2 | 11/2012 | Schell et al. | |
| 8,324,845 B2 | 12/2012 | Suzuki et al. | |
| 8,330,426 B2 | 12/2012 | Suzuki et al. | |
| 8,351,982 B2 | 1/2013 | Rofougaran | |
| 8,360,166 B2 | 1/2013 | Iimura et al. | |
| 8,406,697 B2 | 3/2013 | Arimura et al. | |
| 8,412,179 B2 | 4/2013 | Gerold et al. | |
| 8,438,955 B2 | 5/2013 | Wilson, Jr. et al. | |
| 8,464,808 B2 | 6/2013 | Leü | |
| 8,564,236 B2 | 10/2013 | Hirabayashi et al. | |
| 8,611,250 B2 | 12/2013 | Chen et al. | |
| 8,627,900 B2 | 1/2014 | Oomori et al. | |
| 8,645,176 B2 | 2/2014 | Walton et al. | |
| 8,653,764 B2 * | 2/2014 | Oberheim | B23D 51/20 173/176 |
| 8,657,482 B2 | 2/2014 | Malackowski et al. | |
| 8,666,936 B2 | 3/2014 | Wallace | |

(56) References Cited

U.S. PATENT DOCUMENTS

| | | |
|---|---|---|
| 8,678,106 B2 | 3/2014 | Matsunaga et al. |
| 8,713,806 B2 | 5/2014 | Tokunaga et al. |
| 8,823,322 B2 | 9/2014 | Noda et al. |
| 8,826,548 B2 | 9/2014 | Kaiser et al. |
| 8,833,484 B2* | 9/2014 | Binder .................. B25D 16/003 173/1 |
| 8,851,200 B2* | 10/2014 | Gray ................... H01M 2/1055 173/29 |
| 8,890,449 B2 | 11/2014 | Suzuki et al. |
| 8,919,456 B2 | 12/2014 | Ng et al. |
| 8,960,323 B2* | 2/2015 | Oberheim ............. B23D 51/02 16/431 |
| 8,965,841 B2 | 2/2015 | Wallace |
| 8,981,680 B2 | 3/2015 | Suda et al. |
| 9,026,242 B2 | 5/2015 | Rivers et al. |
| 9,030,145 B2 | 5/2015 | Brennenstuhl et al. |
| 9,031,585 B2 | 5/2015 | Kahle et al. |
| 9,038,743 B2 | 5/2015 | Aoki |
| 9,061,392 B2 | 6/2015 | Forgues et al. |
| 9,073,134 B2 | 7/2015 | Koeder et al. |
| 9,114,519 B2 | 8/2015 | Iwata et al. |
| 9,126,317 B2 | 9/2015 | Lawton et al. |
| 9,144,875 B2 | 9/2015 | Schlesak et al. |
| 9,216,505 B2 | 12/2015 | Rejman et al. |
| 9,233,457 B2 | 1/2016 | Wanek et al. |
| 9,242,356 B2 | 1/2016 | King et al. |
| 9,281,770 B2 | 3/2016 | Wood et al. |
| 9,314,908 B2 | 4/2016 | Tanimoto et al. |
| 2001/0052416 A1 | 12/2001 | Wissmach et al. |
| 2002/0033267 A1 | 3/2002 | Schweizer et al. |
| 2003/0037937 A1* | 2/2003 | Frauhammer ........ B25D 16/006 173/48 |
| 2003/0121677 A1 | 3/2003 | Kady et al. |
| 2003/0134189 A1 | 7/2003 | Kanai et al. |
| 2004/0182587 A1 | 9/2004 | May et al. |
| 2005/0031322 A1 | 2/2005 | Boyle et al. |
| 2006/0009879 A1 | 1/2006 | Lynch et al. |
| 2006/0076385 A1 | 4/2006 | Etter et al. |
| 2007/0252675 A1 | 11/2007 | Lamar |
| 2008/0084334 A1 | 4/2008 | Ballew |
| 2008/0086320 A1 | 4/2008 | Ballew |
| 2008/0086323 A1 | 4/2008 | Ballew et al. |
| 2008/0086349 A1 | 4/2008 | Petrie et al. |
| 2008/0086427 A1 | 4/2008 | Petrie |
| 2008/0086428 A1 | 4/2008 | Wallace |
| 2008/0086685 A1 | 4/2008 | Janky et al. |
| 2008/0152325 A1 | 6/2008 | Bae et al. |
| 2009/0077820 A1 | 3/2009 | Gibbons et al. |
| 2009/0250364 A1 | 10/2009 | Gerold et al. |
| 2009/0251330 A1 | 10/2009 | Gerold et al. |
| 2009/0273436 A1 | 11/2009 | Gluck et al. |
| 2010/0096151 A1 | 4/2010 | Östling |
| 2010/0116519 A1 | 5/2010 | Gareis |
| 2010/0154599 A1 | 6/2010 | Gareis |
| 2010/0176766 A1 | 7/2010 | Brandner et al. |
| 2010/0206596 A1* | 8/2010 | Kamegai ................ B23D 51/01 173/162.2 |
| 2010/0223760 A1* | 9/2010 | Henke ................... B25F 5/006 16/431 |
| 2010/0236802 A1* | 9/2010 | Berger .................. B25D 11/064 173/118 |
| 2011/0056716 A1 | 3/2011 | Jönsson et al. |
| 2011/0067895 A1 | 3/2011 | Nobe et al. |
| 2011/0108600 A1* | 5/2011 | Pedicini ................ B25C 1/047 227/2 |
| 2011/0121223 A1* | 5/2011 | Ulicny .................. F16F 9/535 252/62.52 |
| 2012/0167721 A1 | 7/2012 | Fluhrer |
| 2012/0168189 A1 | 7/2012 | Eckert |
| 2012/0199372 A1 | 8/2012 | Nishikawa et al. |
| 2012/0247796 A1 | 10/2012 | Mueller et al. |
| 2012/0279736 A1 | 11/2012 | Tanimoto et al. |
| 2012/0292070 A1 | 11/2012 | Ito et al. |
| 2012/0293103 A1* | 11/2012 | Forster .................. B25F 5/00 318/503 |
| 2013/0024245 A1 | 1/2013 | Nichols et al. |
| 2013/0062086 A1 | 3/2013 | Ito et al. |
| 2013/0076271 A1 | 3/2013 | Suda et al. |
| 2013/0087355 A1 | 4/2013 | Oomori et al. |
| 2013/0092408 A1 | 4/2013 | Oberheim |
| 2013/0109375 A1 | 5/2013 | Zeiler et al. |
| 2013/0118767 A1 | 5/2013 | Cannaliato et al. |
| 2013/0126202 A1 | 5/2013 | Oomori et al. |
| 2013/0133907 A1 | 5/2013 | Chen et al. |
| 2013/0133910 A1 | 5/2013 | Riedl et al. |
| 2013/0133911 A1 | 5/2013 | Ishikawa et al. |
| 2013/0138465 A1 | 5/2013 | Kahle et al. |
| 2013/0138606 A1 | 5/2013 | Kahle et al. |
| 2013/0153250 A1 | 6/2013 | Eckert |
| 2013/0187587 A1 | 7/2013 | Knight et al. |
| 2013/0188058 A1 | 7/2013 | Nguyen et al. |
| 2013/0191417 A1 | 7/2013 | Petrie et al. |
| 2013/0200248 A1* | 8/2013 | Polzer .................... F16F 15/02 248/550 |
| 2013/0204753 A1 | 8/2013 | Wallace |
| 2013/0209017 A1* | 8/2013 | Schadow .............. B24B 23/028 384/536 |
| 2013/0255980 A1 | 10/2013 | Linehan et al. |
| 2013/0302601 A1 | 11/2013 | Vito et al. |
| 2013/0304545 A1 | 11/2013 | Ballew et al. |
| 2013/0327552 A1 | 12/2013 | Lovelass et al. |
| 2013/0333910 A1 | 12/2013 | Tanimoto et al. |
| 2014/0006295 A1 | 1/2014 | Zeiler et al. |
| 2014/0053419 A1 | 2/2014 | Leh et al. |
| 2014/0054350 A1* | 2/2014 | Pedicini ................. B25C 5/15 227/8 |
| 2014/0069672 A1 | 3/2014 | Mashiko et al. |
| 2014/0107471 A1 | 4/2014 | Haider et al. |
| 2014/0107853 A1 | 4/2014 | Ashinghurst et al. |
| 2014/0117892 A1 | 5/2014 | Coates |
| 2014/0122143 A1 | 5/2014 | Fletcher et al. |
| 2014/0151079 A1 | 6/2014 | Furui et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0166324 A1 | 6/2014 | Puzio et al. |
| 2014/0184397 A1 | 7/2014 | Volpert |
| 2014/0236159 A1 | 8/2014 | Haider et al. |
| 2014/0240125 A1* | 8/2014 | Burch ................. G08B 21/0213 340/539.13 |
| 2014/0245620 A1 | 9/2014 | Fankhauser et al. |
| 2014/0284070 A1 | 9/2014 | Ng et al. |
| 2014/0292245 A1 | 10/2014 | Suzuki et al. |
| 2014/0311763 A1* | 10/2014 | Hoop ..................... B25B 21/02 173/218 |
| 2014/0324194 A1 | 10/2014 | Larsson et al. |
| 2014/0326474 A1* | 11/2014 | Hoop ..................... B25B 21/02 173/122 |
| 2014/0331830 A1 | 11/2014 | King et al. |
| 2014/0334270 A1 | 11/2014 | Kusakawa |
| 2014/0336810 A1 | 11/2014 | Li et al. |
| 2014/0336955 A1 | 11/2014 | Li et al. |
| 2014/0350716 A1 | 11/2014 | Fly et al. |
| 2014/0365259 A1 | 12/2014 | Delplace et al. |
| 2014/0367134 A1 | 12/2014 | Phillips et al. |
| 2014/0374461 A1* | 12/2014 | Pedicini ................. B25C 1/06 227/2 |
| 2014/0379136 A1 | 12/2014 | Schlegel et al. |
| 2015/0000944 A1 | 1/2015 | Dusselberg et al. |
| 2015/0002089 A1 | 1/2015 | Rejman et al. |
| 2015/0042247 A1 | 2/2015 | Kusakawa |
| 2015/0075342 A1 | 3/2015 | Butler et al. |
| 2015/0122524 A1 | 5/2015 | Papp |
| 2015/0135306 A1 | 5/2015 | Winkler et al. |
| 2015/0135907 A1 | 5/2015 | Hirabayashi et al. |
| 2015/0137721 A1 | 5/2015 | Yamamoto et al. |
| 2015/0141999 A1 | 5/2015 | McGinley et al. |
| 2015/0148805 A1 | 5/2015 | McGinley et al. |
| 2015/0148806 A1 | 5/2015 | McGinley et al. |
| 2015/0158157 A1 | 6/2015 | Hirabayashi et al. |
| 2015/0158170 A1 | 6/2015 | Nitsche et al. |

(56) References Cited

U.S. PATENT DOCUMENTS

| | | | |
|---|---|---|---|
| 2015/0171654 A1 | 6/2015 | Horie et al. | |
| 2015/0309640 A1 | 10/2015 | Vuckovic | |
| 2015/0340921 A1 | 11/2015 | Suda et al. | |
| 2015/0345134 A1* | 12/2015 | Takahashi | F16F 15/027 52/167.2 |
| 2015/0375315 A1* | 12/2015 | Ukai | B23D 49/162 30/392 |
| 2016/0022374 A1 | 1/2016 | Haider et al. | |
| 2016/0151845 A1 | 6/2016 | Yamamoto et al. | |
| 2016/0179085 A1* | 6/2016 | Seitz | G05B 19/414 700/180 |
| 2016/0193673 A1 | 7/2016 | Yoshida et al. | |
| 2016/0226278 A1* | 8/2016 | Wenger | H02J 7/0044 |
| 2017/0008159 A1 | 1/2017 | Boeck et al. | |
| 2017/0216986 A1* | 8/2017 | Dey, IV | B23D 51/16 |
| 2017/0274489 A1* | 9/2017 | Baratta | B23D 59/001 |
| 2019/0051437 A1* | 2/2019 | Komori | C10M 141/02 |

FOREIGN PATENT DOCUMENTS

| | | |
|---|---|---|
| DE | 202006014606 | 1/2007 |
| EP | 2147750 | 1/2010 |
| JP | 2000176850 | 6/2000 |
| JP | 2003191178 A | 7/2003 |
| JP | 2004504169 A | 2/2004 |
| JP | 2004072563 | 3/2004 |
| JP | 2004322262 | 11/2004 |
| JP | 2006123080 | 5/2006 |
| JP | 4359018 | 11/2009 |
| JP | 2014018868 A | 2/2014 |
| JP | 2002372095 A | 1/2021 |
| WO | WO02030624 | 4/2002 |
| WO | WO2005019682 | 3/2005 |
| WO | WO2007083447 | 7/2007 |
| WO | WO2007090258 | 8/2007 |
| WO | WO2007141578 | 12/2007 |
| WO | 2009/047185 A2 | 4/2009 |
| WO | WO2013116303 | 8/2013 |
| WO | WO2014144780 | 9/2014 |

OTHER PUBLICATIONS

European Patent Office Extended Search Report for Application No. 17736214.2 dated Sep. 18, 2019 (8 pages).
Korean Patent Office Action for Application No. 10-2018-7022377 dated Feb. 3, 2020 (9 pages including English translation).
Korean Patent Office Action for Application No. 10-2018-7022377 dated Nov. 17, 2020 (8 pages including English translation).
Japanese Patent Office Action for Application No. 2018-533943 dated Jan. 19, 2021 (7 pages including machine English translation).

* cited by examiner

VIBRATION REDUCTION SYSTEM AND METHOD FOR POWER TOOLS

RELATED APPLICATIONS

This application claims priority to U.S. Provisional Patent Application No. 62/275,107, filed on Jan. 5, 2016, the entire contents of which are hereby incorporated by reference.

FIELD OF THE INVENTION

The present invention relates to reducing vibration of a power tool during operation.

SUMMARY

In one embodiment, a power tool is provided that includes a housing and a motor within the housing. The motor includes a rotor and a stator, and the rotor is coupled to a drive mechanism to produce an output. The power tool further includes a magnetically susceptible fluid located within the housing. The power tool further includes an inductor within the housing and configured to introduce a magnetic field to the magnetically susceptible fluid. The power tool further includes a sensor configured to indicate an amount of vibration experienced by the power tool. The power tool further includes an electronic processor coupled to the sensor and to the inductor. The electronic processor is configured to receive an input signal from the sensor indicating the amount of vibration, to generate a control signal based on the input signal, and to provide the control signal to the inductor to control the magnetic field.

In one embodiment, a method of reducing vibration experienced by a power tool is provided. The method includes generating, with a sensor, an input signal indicating an amount of vibration experienced by the power tool. The method further includes receiving, with an electronic processor from the sensor, the input signal. The method further includes generating, with the electronic processor, a control signal based on the input signal. The method further includes transmitting the control signal from the electronic processor to an inductor. The method further includes introducing a magnetic field, with the inductor based on the control signal, to a magnetically susceptible fluid located within a housing of the power tool. The power tool includes a motor including a rotor and a stator. The rotor is coupled to a drive mechanism to produce an output.

In one embodiment, a communication system is provided that includes an external device and a power tool. The external device includes a first wireless communication controller and a display. The display is configured to receive a selection of at least one parameter. The power tool includes a second wireless communication controller configured to receive the at least one parameter from the first wireless communication controller. The power tool further includes a housing and a motor within the housing. The motor includes a rotor and a stator, and the rotor is coupled to a drive mechanism to produce an output. The power tool further includes a magnetically susceptible fluid located within the housing. The power tool further includes an inductor within the housing and configured to introduce a magnetic field to the magnetically susceptible fluid. The power tool further includes a sensor configured to determine an amount of vibration experienced by the power tool. The power tool further includes an electronic processor coupled to the sensor and to the inductor. The electronic processor is configured to receive an input signal from the sensor indicating the amount of vibration, to generate a control signal based on the input signal, and to provide the control signal to the inductor to control the magnetic field.

DETAILED DESCRIPTION

Figure 1:
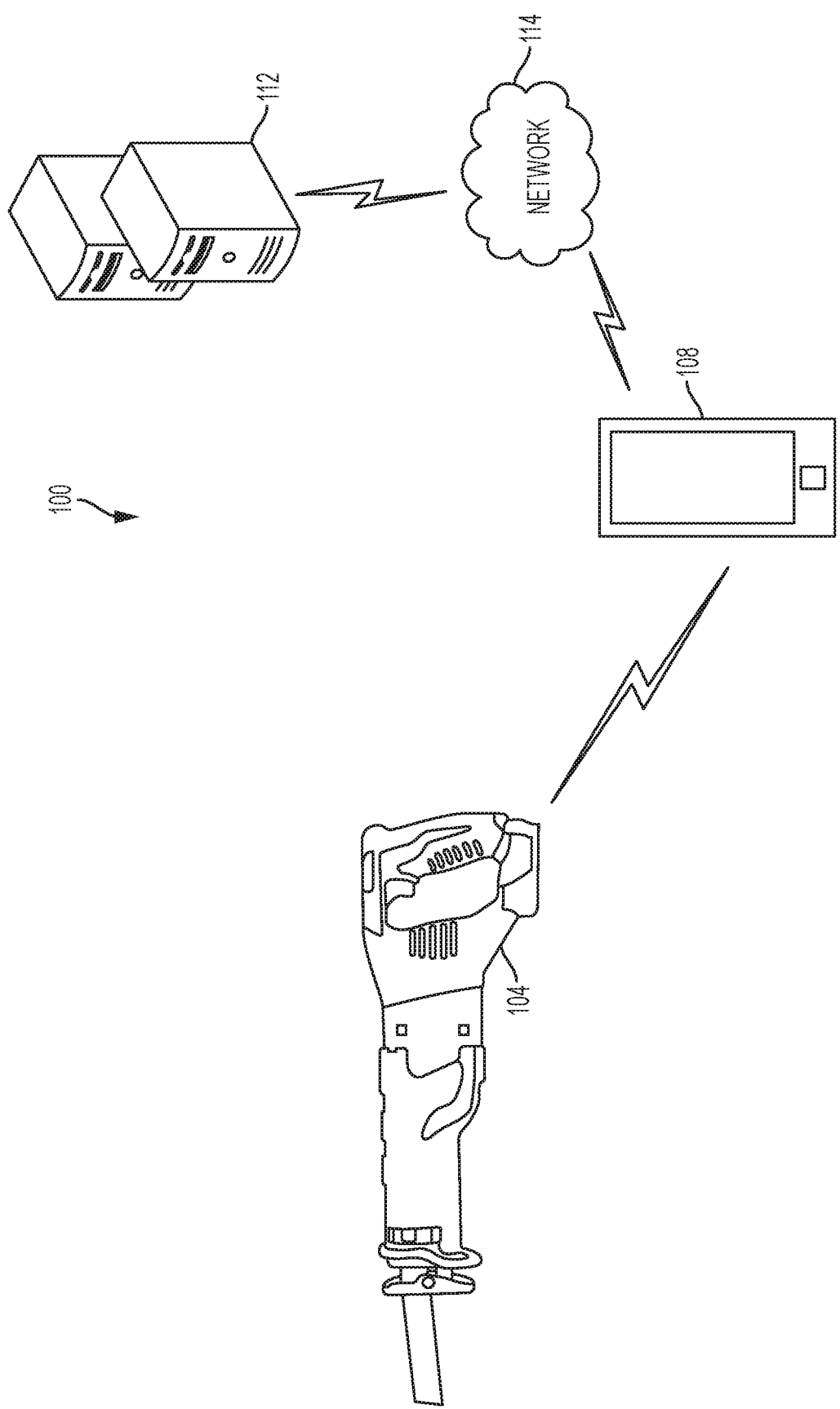
FIG. 1 illustrates a communication system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a communication system 100. The communication system 100 includes a power tool 104 (i.e., a reciprocating saw) and an external device 108. The power tool 104 and the external device 108 can communicate wirelessly while they are within a communication range of each other. The power tool 104 may communicate power tool status, power tool operation statistics, power tool identification, stored power tool usage information, power tool maintenance data, and the like to the external device 108. Therefore, using the external device 108, a user can access stored power tool usage or power tool maintenance data. With this tool data, a user can determine how the power tool 104 has been used, whether maintenance is recommended or has been performed in the past, and identify malfunctioning components or other reasons for certain performance issues. The external device 108 can also transmit data to the power tool 104 for power tool configuration, firmware updates, or to send commands (e.g., turn on a work light). The external device 108 also allows a user to set operational parameters, safety parameters, select tool modes, and the like for the power tool 104.

The external device 108 may be, for example, a smart phone (as illustrated), a laptop computer, a tablet computer, a personal digital assistant (PDA), or another electronic device capable of communicating wirelessly with the power tool 104 and providing a user interface. The external device 108 provides a user interface and allows a user to access and interact with tool information. For instance, the external device 108 can receive user inputs to determine operational parameters, enable or disable features, and the like. The user interface of the external device 108 provides an easy-to-use interface for the user to control and customize operation of the power tool (for example, see FIG. 4B).

The external device 108 includes a communication interface that is compatible with a wireless communication interface or module of the power tool 104. The communication interface of the external device 108 may include a wireless communication controller (e.g., a Bluetooth® module), or a similar component as shown, for example, in FIG. 4A. In some embodiments, the external device 108 and the power tool 104 communicate via a wired connection, such as a serial data bus.

In addition, with reference to FIG. 1, the external device 108 can also share the information obtained from the power tool 104 with a remote server 112 connected by a network 114. The remote server 112 may be used to store the data obtained from the external device 108, provide additional functionality and services to the user, or a combination thereof. In one embodiment, storing the information on the remote server 112 allows a user to access the information from a plurality of different locations. In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool 104, typical usage of the power tool 104, and other relevant characteristics and/or measures of the power tool 104. The network 114 may include various networking elements (routers, hubs, switches, cellular towers, wired connections, wireless connections, etc.) for connecting to, for example, the Internet, a cellular data network, a local network, or a combination thereof. In some embodiments, the power tool 104 may be configured to communicate directly with the server 112 through an additional wireless interface or with the same wireless interface that the power tool 104 uses to communicate with the external device 108.

Figure 2:
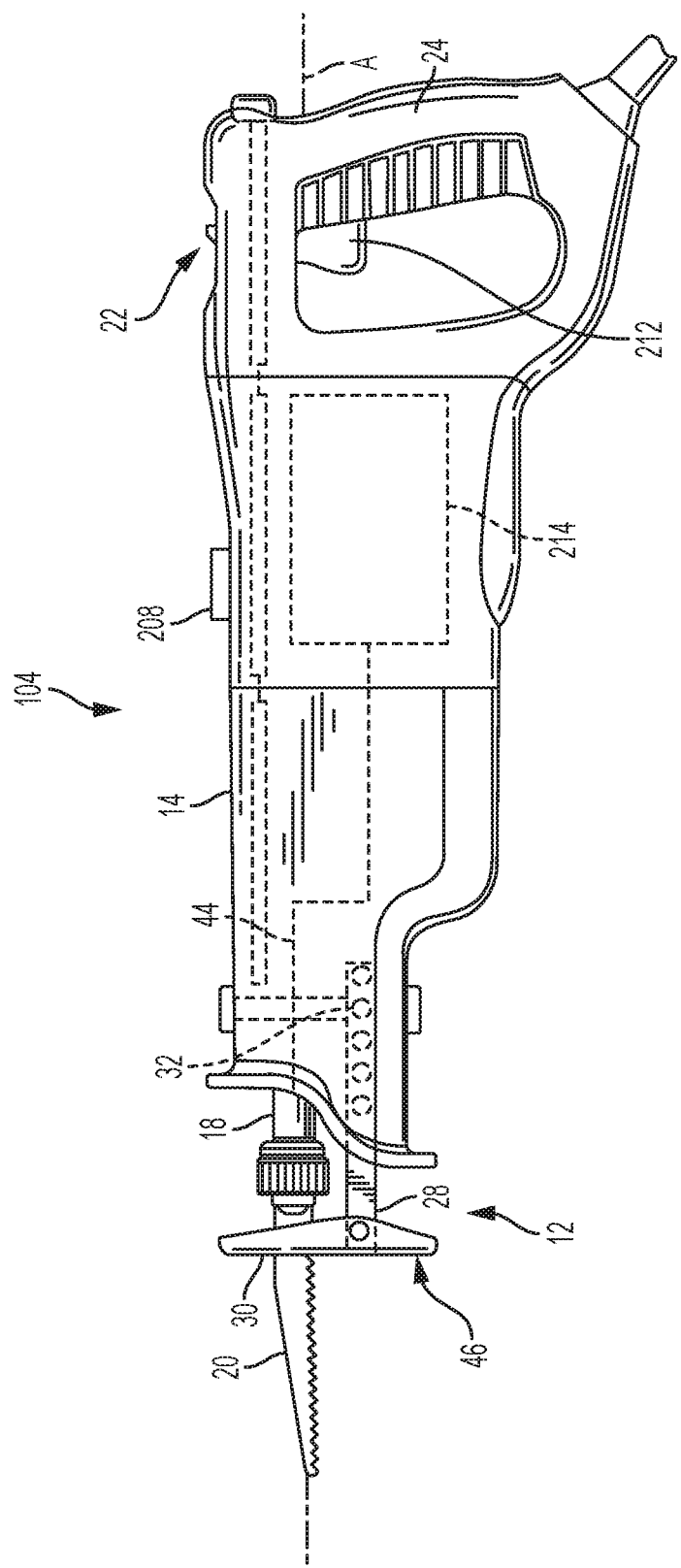
FIG. 2 illustrates a power tool of the communication system.

FIG. 2 illustrates the power tool 104 as a reciprocating saw. Although FIGS. 1 and 2 illustrate the power tool 104 as a reciprocating sabre saw, it is to be understood that various embodiments described herein may be implemented on other types of reciprocating saws including, but not limited to, jigsaws, scroll saws, and rotary reciprocating saws. Furthermore, it is to be understood that various embodiments described herein may be implemented on other power tools that vibrate when operated, including, but not limited to, drill/drivers, impact drivers, impact wrenches, and rotary hammers.

The power tool 104 defines a longitudinal axis A. The power tool 104 generally includes a shoe assembly 12, a main body 14 having a motor 214 provided with power via an electric cord (an AC version), a battery pack (a DC version) or a source of compressed air (a pneumatic version). A drive mechanism 44 converts rotational motion of the motor 214 to reciprocating motion of a reciprocating spindle 18 to reciprocate a saw blade 20 in a direction substantially parallel to the longitudinal axis A of the power tool 104. The power tool 104 also includes a handle assembly 22 positioned at a distal end of the main body 14 opposite the shoe assembly 12. The handle assembly 22 includes a grip portion 24 and a trigger 212 adjacent the grip portion 24 for actuating the motor 214. The trigger 212 is positioned such that a user can actuate the trigger 212 using the same hand that is holding the grip portion 24, for example, with an index finger. The power tool 104 further includes a mode pad 208. The mode pad 208 allows a user to select a mode of the power tool 104 and indicates to the user the currently selected mode of the power tool 104, which are described in greater detail below.

The shoe assembly 12 includes a shoe post 28 and a shoe 30. The shoe 30 is pivotally mounted on a distal end of the shoe post 28 away from the main body 14. In other constructions, the shoe 30 may be fixedly mounted to the shoe post 28, or mounted in other suitable ways. In other constructions, other types of shoe assemblies may be employed. The shoe assembly 12 is secured relative to the main body 14 of the power tool 104 and provides a guiding surface 46 for resting the power tool 104 against a workpiece (not shown) during cutting operations. The shoe assembly 12 includes the longitudinally-extending shoe post 28, extending substantially parallel to the longitudinal axis A of the power tool 104, which is at least partially disposed within an orifice of the main body 14 of the power tool 104. The shoe post 28 is axially movable relative to the main body 14 of the power tool 104 in a direction substantially parallel to the axis A and includes a locking mechanism 32 for stabilizing the shoe assembly 12 in one of a plurality of axial positions relative to the main body 14. For example, the locking mechanism 32 may include a ball detent system. In other constructions, other suitable types of locking mechanisms may be employed, such as magnets, cams, other types of detent mechanisms, etc.

Figure 3A:
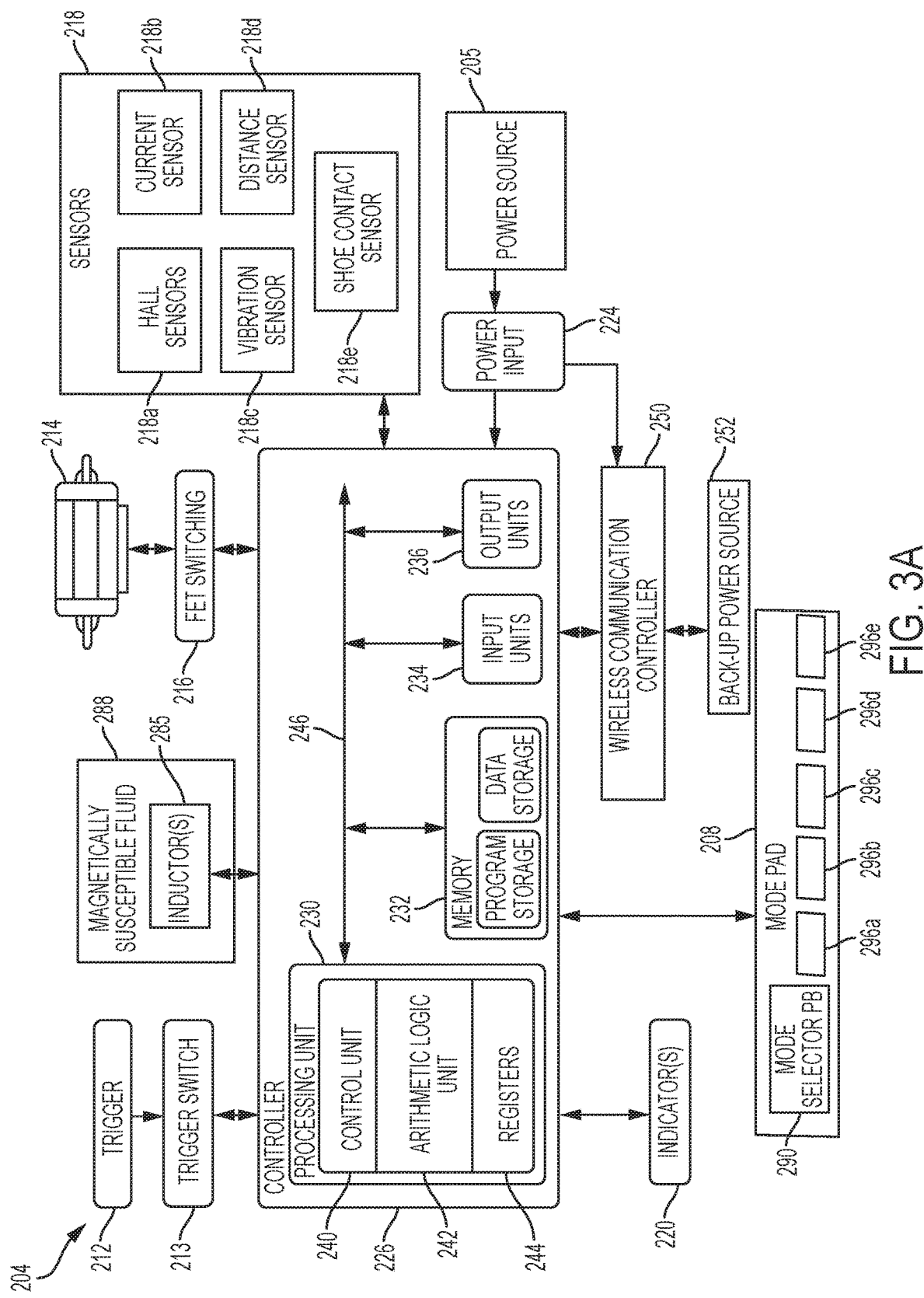
FIGS. 3A-B illustrate a schematic diagram of the power tool.

FIG. 3A illustrates a schematic diagram of the power tool 104 including the motor 214. The motor 214 actuates the drive mechanism 44 as explained previously herein. A primary power source (e.g., a battery pack) 205 couples to the power tool 104 and provides electrical power to energize the motor 214. The motor 214 is energized based on the position of the trigger 212. When the trigger 212 is depressed, the motor 214 is energized, and when the trigger 212 is released, the motor 214 is de-energized. In the illustrated embodiment, the trigger 212 extends partially down a length of the handle assembly 22; however, in other embodiments the trigger 212 extends down the entire length of the handle assembly 22 or may be positioned elsewhere on the reciprocating saw 204. The trigger 212 is moveably coupled to the handle assembly 22 such that the trigger 212 moves with respect to the tool housing. The trigger 212 is coupled to a push rod, which is engageable with a trigger switch 213 (see FIG. 3A). The trigger 212 moves in a first direction towards the handle assembly 22 when the trigger 212 is depressed by the user. The trigger 212 is biased (e.g., with a spring) such that it moves in a second direction away from the handle assembly 22, when the trigger 212 is released by the user.

When the trigger 212 is depressed by the user, the push rod activates the trigger switch 213, and when the trigger 212 is released by the user, the trigger switch 213 is deactivated. In other embodiments, the trigger 212 is coupled to an electrical trigger switch 213. In such embodiments, the trigger switch 213 may include, for example, a transistor. Additionally, for such electronic embodiments, the trigger 212 may not include a push rod to activate the mechanical switch. Rather, the electrical trigger switch 213 may be activated by, for example, a position sensor (e.g., a Hall-Effect sensor) that relays information about the relative position of the trigger 212 to the tool housing or electrical trigger switch 213. The trigger switch 213 outputs a signal indicative of the position of the trigger 212. In some instances, the signal is binary and indicates either that the trigger 212 is depressed or released. In other instances, the signal indicates the position of the trigger 212 with more precision. For example, the trigger switch 213 may output an analog signal that varies from 0 to 5 volts depending on the extent that the trigger 212 is depressed. For example, 0 V output indicates that the trigger 212 is released, 1 V output indicates that the trigger 212 is 20% depressed, 2 V output indicates that the trigger 212 is 40% depressed, 3 V output indicates that the trigger 212 is 60% depressed 4 V output indicates that the trigger 212 is 80% depressed, and 5 V indicates that the trigger 212 is 100% depressed. The signal output by the trigger switch 213 may be analog or digital.

As shown in FIG. 3A, the power tool 104 also includes the power source 205, a switching network 216, sensors 218, indicators 220, a power input unit 224, a controller 226, a wireless communication controller 250, and a back-up power source 252. The power source 205 provides power to the power input unit 224. The power input unit 224 includes active and/or passive components (e.g., voltage step-down controllers, voltage converters, rectifiers, filters, etc.) to regulate or control the power received from the power source 205 and by the wireless communication controller 250 and controller 226.

In some embodiments, the power tool 104 includes a battery pack interface (not shown). In such embodiments, the battery pack interface is coupled to the controller 226 and couples to a battery pack. The battery pack interface includes a combination of mechanical and electrical components configured to and operable for interfacing (e.g., mechanically, electrically, and communicatively connecting) the power tool 104 with the battery pack. The battery pack interface is coupled to the power input unit 224. The battery pack interface transmits the power received from the battery pack to the power input unit 224.

The switching network 216 enables the controller 226 to control the operation of the motor 214. Generally, when the trigger 212 is depressed as indicated by an output of the trigger switch 213, electrical current is supplied from the battery pack interface 222 to the motor 214, via the switching network 216. When the trigger 212 is not depressed, electrical current is not supplied from the battery pack interface 222 to the motor 214.

In response to the controller 226 receiving the activation signal from the trigger switch 213, the controller 226 activates the switching network 216 to provide power to the motor 214. The switching network 216 controls the amount of current available to the motor 214 and thereby controls the speed and torque output of the motor 214. The switching network 216 may include numerous FETs, bipolar transistors, or other types of electrical switches. For instance, the switching network 216 may include a six-FET bridge that receives pulse-width modulated (PWM) signals from the controller 226 to drive the motor 214.

The sensors 218 are coupled to the controller 226 and communicate to the controller 226 various signals indicative of different parameters of the power tool 104 or the motor 214. The sensors 218 may include Hall sensors 218a, current sensors 218b, vibration sensors 218c, distance sensors 218d, shoe contact sensors 218e, among other sensors, such as, for example, one or more voltage sensors, one or more temperature sensors, and one or more torque sensors. The controller 226 can monitor the current drawn by the motor 214 using current sensor 218b. Vibration sensor 218c may be an accelerometer that can determine the vibration experienced by the power tool 104. The distance sensor 218d may be an induction sensor that determines the distance between the material being cut and the shoe 30. Additionally, the shoe contact sensor 218e may be an induction sensor that determines whether material is contacting the shoe 30.

Each Hall sensor 218a outputs motor feedback information to the controller 226, such as an indication (e.g., a pulse) when a magnet of the motor's rotor rotates across the face of that Hall sensor. Based on the motor feedback information from the Hall sensors 218a, the controller 226 can determine the position, velocity, and acceleration of the rotor. In response to the motor feedback information and the signals from the trigger switch 213, the controller 226 transmits control signals to control the switching network 216 to drive the motor 214. For instance, by selectively enabling and disabling the FETs of the switching network 216, power received via the power source 205 is selectively applied to stator coils of the motor 214 to cause rotation of its rotor. The motor feedback information is used by the controller 226 to ensure proper timing of control signals to the switching network 216 and, in some instances, to provide closed-loop feedback to control the speed of the motor 214 to be at a desired level.

The indicators 220 are also coupled to the controller 226 and receive control signals from the controller 226 to turn on and off or otherwise convey information based on different states of the power tool 104. The indicators 220 include, for example, one or more light-emitting diodes ("LED"), or a display screen. The indicators 220 can be configured to display conditions of, or information associated with, the power tool 104. For example, the indicators 220 are configured to indicate measured electrical characteristics of the power tool 104, the status of the power tool 104, the mode of the power tool (discussed below), etc. The indicators 220 may also include elements to convey information to a user through audible or tactile outputs.

As described above, the controller 226 is electrically and/or communicatively connected to a variety of modules or components of the power tool 104. In some embodiments, the controller 226 includes a plurality of electrical and electronic components that provide power, operational control, and protection to the components and modules within the controller 226 and/or power tool 104. For example, the controller 226 includes, among other things, a processing unit 230 (e.g., a microprocessor, a microcontroller, or another suitable programmable device), a memory 232, input units 234, and output units 236. The processing unit 230 (herein, electronic processor 230) includes, among other things, a control unit 240, an arithmetic logic unit ("ALU")

242, and a plurality of registers 244 (shown as a group of registers in FIG. 3A). In some embodiments, the controller 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the power tool 104 can be stored in the memory 232 of the controller 226. The software includes, for example, firmware, one or more applications, program data, filters, rules, one or more program modules, and other executable instructions. The electronic processor 230 is configured to retrieve from memory and execute, among other things, instructions related to the control processes and methods described herein. The electronic processor 230 is also configured to store power tool information on the memory 232 including operational data, information identifying the type of tool, a unique identifier for the particular tool, and other information relevant to operating or maintaining the power tool 104. The tool usage information, such as current levels, motor speed, motor acceleration, motor direction, may be captured or inferred from data output by the sensors 218. Such power tool information may then be accessed by a user with the external device 108. In other constructions, the controller 226 includes additional, fewer, or different components.

The wireless communication controller 250 is coupled to the controller 226. In the illustrated embodiment, the wireless communication controller 250 is located near the handle assembly 22 of the power tool 104 to save space and ensure that the magnetic activity of the motor 214 does not affect the wireless communication between the power tool 104 and the external device 108.

Figure 3B:
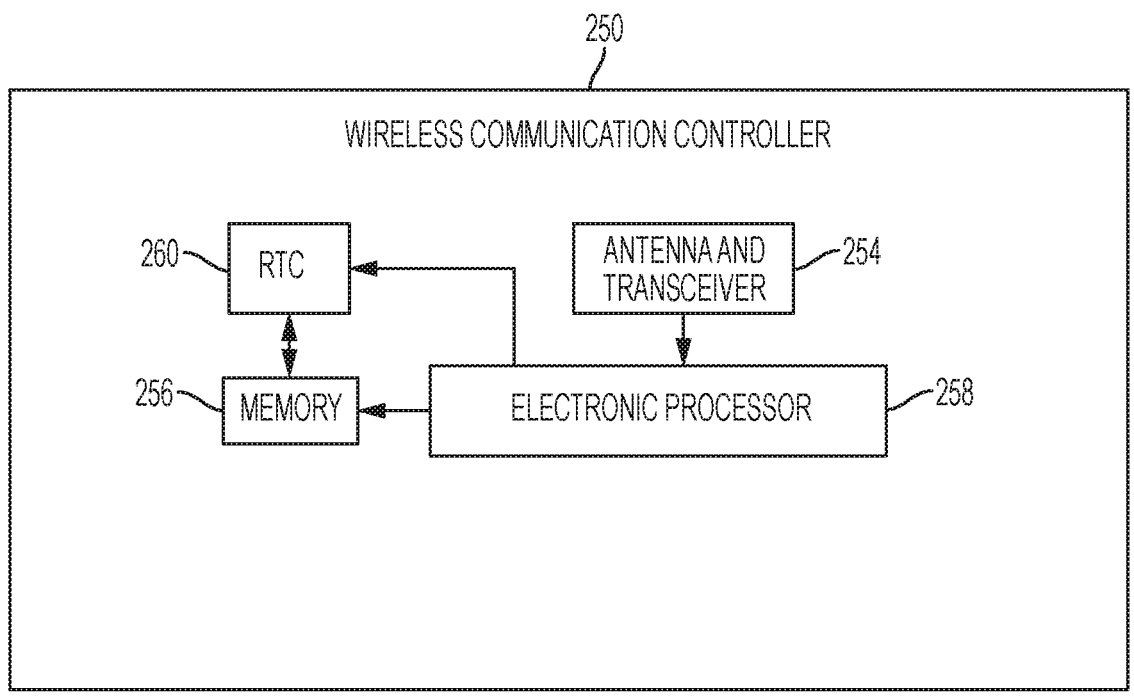

As shown in FIG. 3B, the wireless communication controller 250 includes a radio transceiver and antenna 254, a memory 256, an electronic processor 258, and a real-time clock (RTC) 260. The radio transceiver and antenna 254 operate together to send and receive wireless messages to and from the external device 108 and the electronic processor 258. The memory 256 can store instructions to be implemented by the electronic processor 258 and/or may store data related to communications between the power tool 104 and the external device 108 or the like. The electronic processor 258 for the wireless communication controller 250 controls wireless communications between the power tool 104 and the external device 108. For example, the electronic processor 258 associated with the wireless communication controller 250 buffers incoming and/or outgoing data, communicates with the controller 226, and determines the communication protocol and/or settings to use in wireless communications.

In the illustrated embodiment, the wireless communication controller 250 is a Bluetooth® controller. The Bluetooth® controller communicates with the external device 108 employing the Bluetooth® protocol. Therefore, in the illustrated embodiment, the external device 108 and the power tool 104 are within a communication range (i.e., in proximity) of each other while they exchange data. In other embodiments, the wireless communication controller 250 communicates using other protocols (e.g., Wi-Fi, cellular protocols, a proprietary protocol, etc.) over different type of wireless networks. For example, the wireless communication controller 250 may be configured to communicate via Wi-Fi through a wide area network such as the Internet or a local area network, or to communicate through a piconet (e.g., using infrared or NFC communications). The communication via the wireless communication controller 250 may be encrypted to protect the data exchanged between the power tool 104 and the external device 108 and the server 112 from third parties.

The wireless communication controller 250 is configured to receive data from the power tool controller 226 and relay the information to the external device 108 via the transceiver and antenna 254. In a similar manner, the wireless communication controller 250 is configured to receive information (e.g., configuration and programming information) from the external device 108 via the transceiver and antenna 254 and relay the information to the power tool controller 226.

The RTC 260 increments and keeps time independently of the other power tool components. The RTC 260 receives power from the power source 205 when the power source 205 is connected to the power tool 104 and receives power from the back-up power source 252 when the power source 205 is not connected to the power tool 104. Having the RTC 260 as an independently powered clock enables time stamping of operational data (stored in memory 232 for later export) and a security feature whereby a lockout time is set by a user and the tool is locked-out when the time of the RTC 260 exceeds the set lockout time.

The power tool 104 operates in various modes. Each mode enables different features to be executed by the power tool 104 and facilitates certain applications for the user. The current operational mode of the power tool 104 is selected by the user for instance, using the mode pad 208. For example, with respect to FIG. 3A, the mode pad 208 includes a mode selector push button 290 and mode indicators 296a-e. By depressing the mode selector push button 290, the electronic processor 230 cycles between modes of the power tool 104. The electronic processor 230 also controls the mode indicators 296a-e to illuminate in a certain manner to indicate the current mode.

Figure 4A:
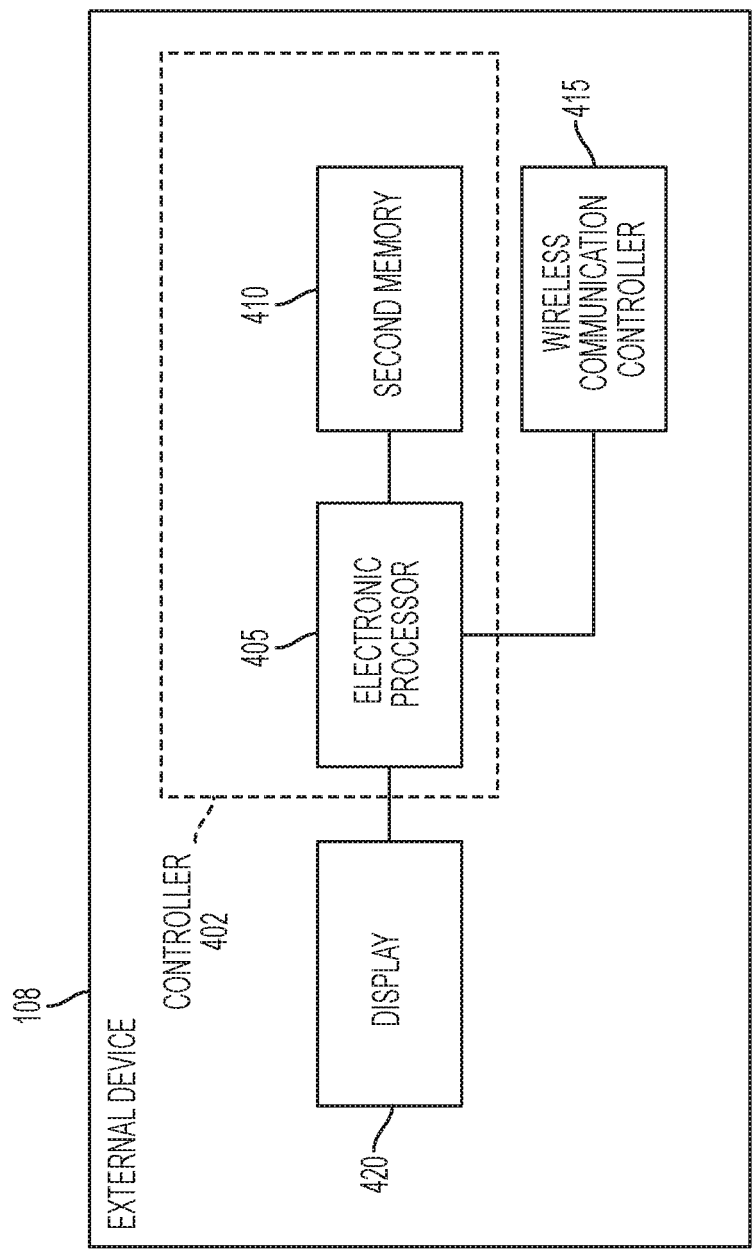
FIG. 4A illustrates a schematic diagram of an external device of the communication system.

FIG. 4A illustrates a schematic diagram of an exemplary external device 108 according to one embodiment. The external device 108 includes a controller 402 that includes an electronic processor 405 and a memory 410. The external device 108 also includes a wireless communication controller 415 and a display 420. In some embodiments, the controller 402, the electronic processor 405, the memory 410, and the wireless communication controller 415 are similar to the corresponding components of the power tool 104 described above with respect to FIGS. 3A and 3B and perform similar functions. In some embodiments, the external device 108 may include fewer or additional components in configurations different from that illustrated in FIG. 4A. For example, in some embodiments, the external device 108 also includes a camera, a location component (for example, a global positioning system receiver), a microphone, and a speaker. In some embodiments, the display 420 is a touch-sensitive display that includes both a display device (for example, a liquid crystal display (LCD) screen panel) and a user input device (for example, the touch-sensitive component that detects contact by a stylus or finger).

As mentioned above, the power tool 104 can communicate with the external device 108. The external device 108 generates a graphical user interface on the display 420 that receives various control parameters from a user. The graphical user interface presents a mode profile to the user. The mode profile includes a select set of parameters, each with manipulatable selectors (e.g., toggles, sliders, or text boxes). For example, a first mode profile may include a motor speed parameter and a work light parameter. The first mode profile further defines specific parameter values for the motor speed and a brightness for the work light. The graphical user interface on the display 420 receives selections from a user specifying the parameter values for parameters of the mode profile. The parameters may be specified as binary values (e.g., on or off), as absolute values (e.g., 1500 RPM or 15 revolutions), as percentages (e.g., 75% of maximum RPM), or using another scale (e.g., sensitivity level) that the electronic processor 230 can convert into absolute values for controlling the operation of the power tool 104. The parameters set by the user on the graphical user interface are transmitted by the external device 108 to the power tool 104.

Figure 4B:
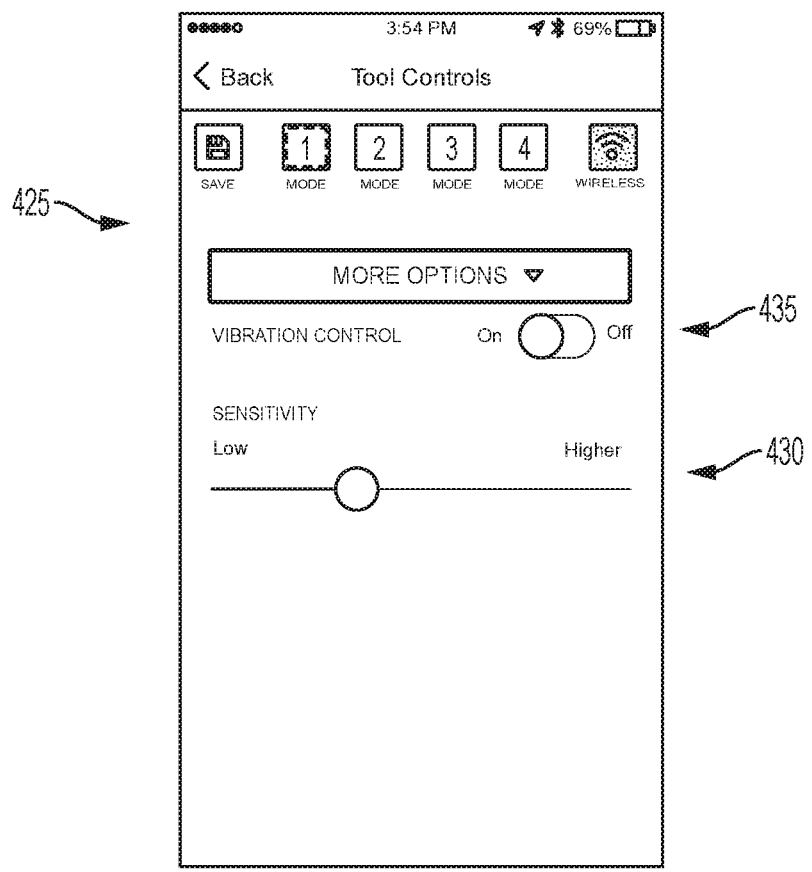
FIG. 4B illustrates an exemplary screenshot of a user interface of the external device of the communication system.

FIG. 4B illustrates an exemplary screenshot of a graphical user interface 425 generated on the display 420 by the electronic processor 405 of the external device 108 in communication with the power tool 104. The external device 108 can, in some embodiments, be used to program the operation of the power tool 104. For example, as shown in FIG. 4B, the external device 108 can generate the graphical user interface 425 including a plurality of selectors (e.g., slider 430 and toggle 435) configured to receive user selections to specify parameter values. For example, the user may select a desired sensitivity level of a vibration control feature and whether to implement the vibration control feature. The graphical user interface 425 is merely exemplary and more or fewer adjustable parameters may be provided on the graphical user interface 425. After the user sets the parameters, the external device 108 transmits the parameters to the power tool 104 to implement during operation.

Figure 7A:
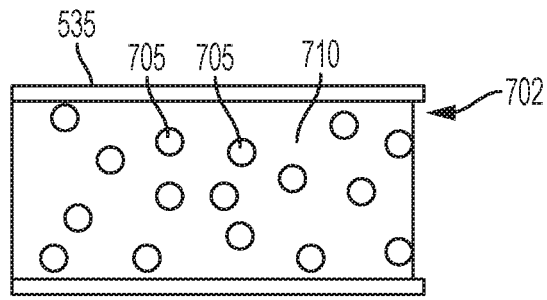
FIGS. 7A-7C illustrate the magnetically susceptible fluid located in a tube according to one exemplary embodiment.
Figure 7B:
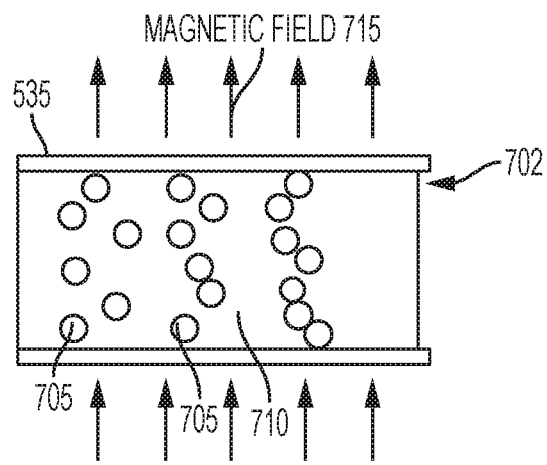
Figure 7C:
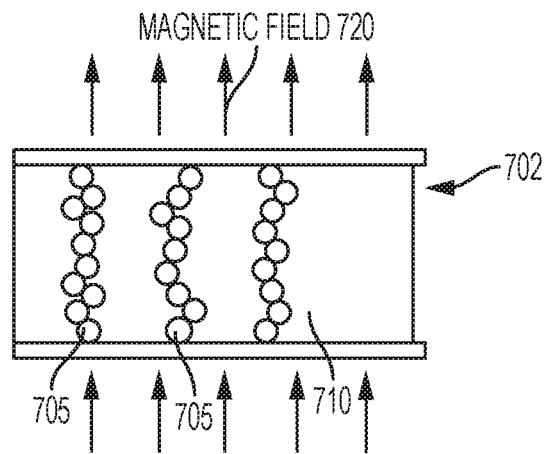

Referring back to FIG. 3A, the power tool 104 also includes at least one inductor 285 surrounded by or adjacent to a volume of magnetically susceptible fluid 288. In some embodiments, the magnetically susceptible fluid is a magneto-rheological (MR) fluid 702 that includes micron-sized magnetizable particles 705 in a carrier fluid 710 (for example, as shown in FIGS. 7A-7C). In FIGS. 7A-7C, the MR fluid 702 is located in a tube (for example, meandering tube system 535 explained in greater detail below with respect to FIG. 5D). In some embodiments, the MR fluid 702 changes from a free-flowing liquid to a semi-solid with controllable yield strength based on a strength of a magnetic field applied to the MR fluid 702 by the inductor 285. For example, in FIG. 7A when the inductor 285 does not apply a magnetic field to the MR fluid 702, the MR fluid 702 is a free-flowing liquid because movement of the particles 705 is not restricted by a magnetic field. In FIG. 7B, the inductor 285 applies a magnetic field 715 to the MR fluid 702 and causes the particles 705 to at least partially align with the direction of the magnetic field 715. Accordingly, the movement of the MR fluid 702 is restricted in proportion to the strength of the magnetic field 715. In FIG. 7C, the inductor 285 applies a magnetic field 720 that is stronger than the magnetic field 715. Accordingly, as shown in FIG. 7C, the particles 705 further align with the direction of the magnetic field 720 and restrict movement in proportion to the strength of the magnetic field 720. In some embodiments, a yield stress (in other words, the stress at which a material begins to deform) of the MR fluid 702 increases proportionally as the strength of the magnetic field applied to the MR fluid 702 increases.

Figure 5A:
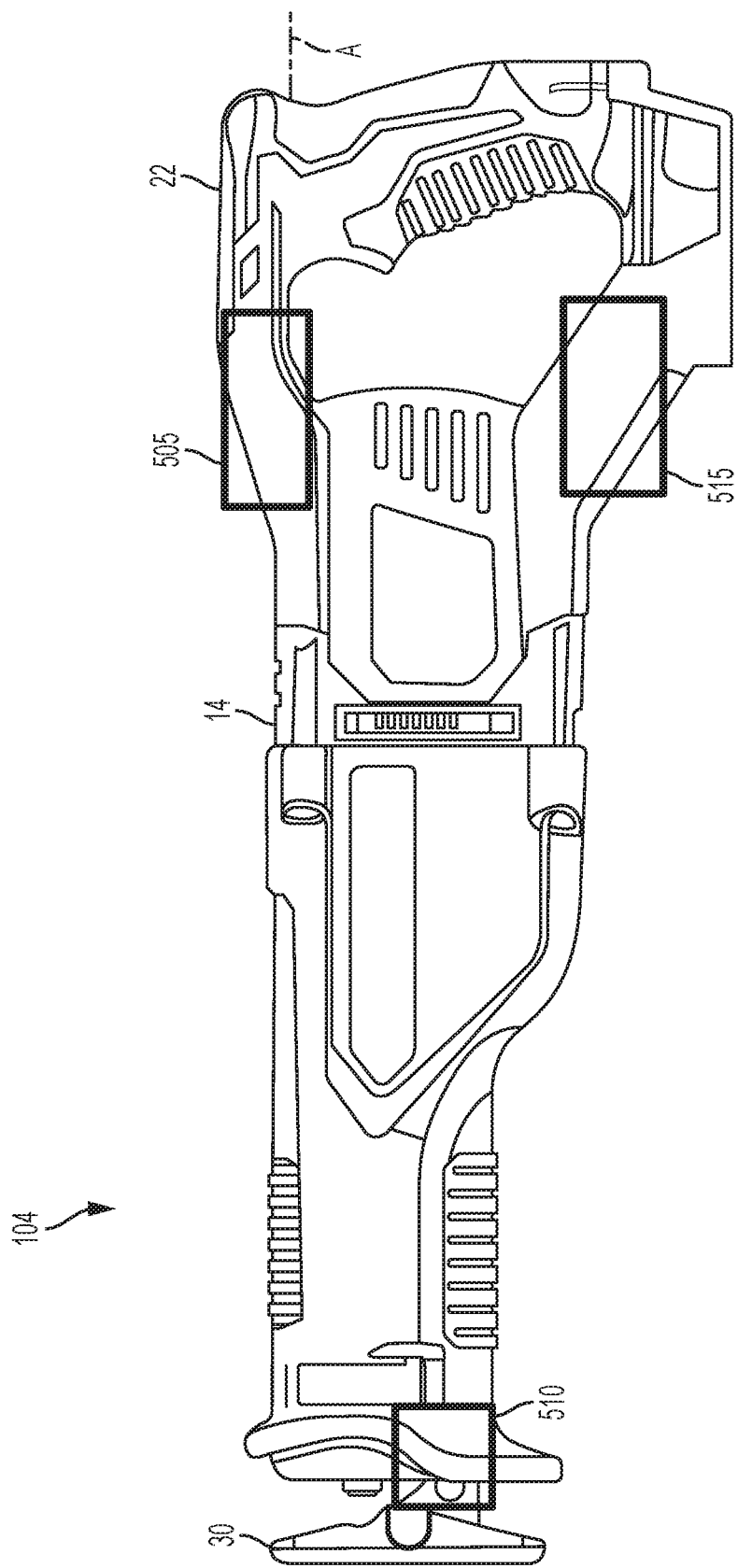
FIGS. 5A-5D illustrate exemplary locations of magnetically susceptible fluid within the power tool according to some embodiments.

In some embodiments, the magnetically susceptible fluid 288 may be located in the handle assembly 22, the gear case (not shown), and/or other locations inside the housing of the power tool 104. FIGS. 5A-5D show exemplary locations of magnetically susceptible fluid 288 within the power tool 104. In general, each location of magnetically susceptible fluid 288 has an inductor 285 located proximally to the magnetically susceptible fluid 288. FIG. 5A illustrates a first location 505, a second location 510, and a third location 515 where magnetically susceptible fluid 288 may be located within the power tool 104. The power tool 104 may include magnetically susceptible fluid 288 in any combination of the first location 505, the second location 510, and the third location 515. Additionally or alternatively, the power tool 104 may include magnetically susceptible fluid 288 in other locations inside the power tool 104.

Figure 5B:
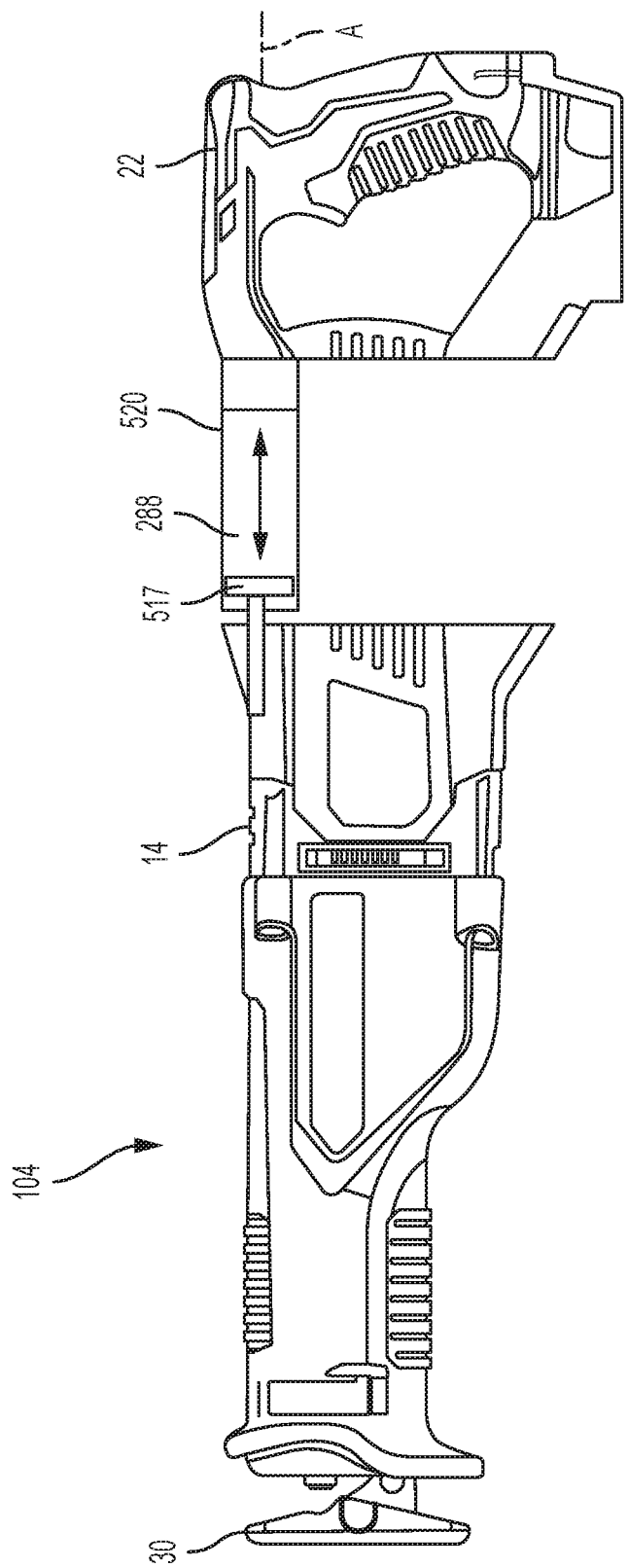

FIG. 5B illustrates the magnetically susceptible fluid 288 at the first location 505 in greater detail and with a portion of the power tool 104 cut away. A first piston 517 may be placed in a first reservoir 520 of magnetically susceptible fluid 288 in between two parts of the power tool 104 (e.g., the handle assembly 22 and the main body 14). In some embodiments, the first piston 517 is the sole connection between the handle assembly 22 and the main body 14 of the power tool 104. For example, in FIG. 5B, the first piston 517 has a first end connected to the main body 14 and a second end in the first reservoir 520. The first reservoir 520 is then connected to the handle 27. For example, the first piston 517 and the first reservoir 520 may be coupled to an interior of the housing of the power tool 104 using a fastener and a flange. As another example, the interior of the tool housing may include cut-outs or compartments for holding the first piston 517 and the first reservoir 520. Thus, the handle assembly 22 may be isolated from the main body 14 of the power tool 104 through the first reservoir 520 of magnetically susceptible fluid 288. As illustrated by the arrow in FIG. 5B, the first piston 517 may move within the first reservoir 520 along the longitudinal axis A of the power tool 104. In some embodiments, the first piston 517 may move in additional or alternate directions. For example, the first piston 517 may move vertically on an axis perpendicular to the longitudinal axis A and/or horizontally on an axis perpendicular to the longitudinal axis A (i.e., in and out of the page). Although FIG. 5B shows the first piston 517 coupled to the main body 14 and the first reservoir 520 coupled to the handle assembly 22, in some embodiments, the first piston 517 and the first reservoir 520 may be coupled to opposite parts of the power tool 104. In other words, in some embodiments, the first piston 517 is coupled to the handle assembly 22 and the first reservoir 520 is coupled to the main body 14. Although not shown in FIG. 5B, a similar piston and reservoir of magnetically susceptible fluid 288 may be located at the third location 515 of the power tool 104 between the handle assembly 22 and the main body 14.

Figure 5C:
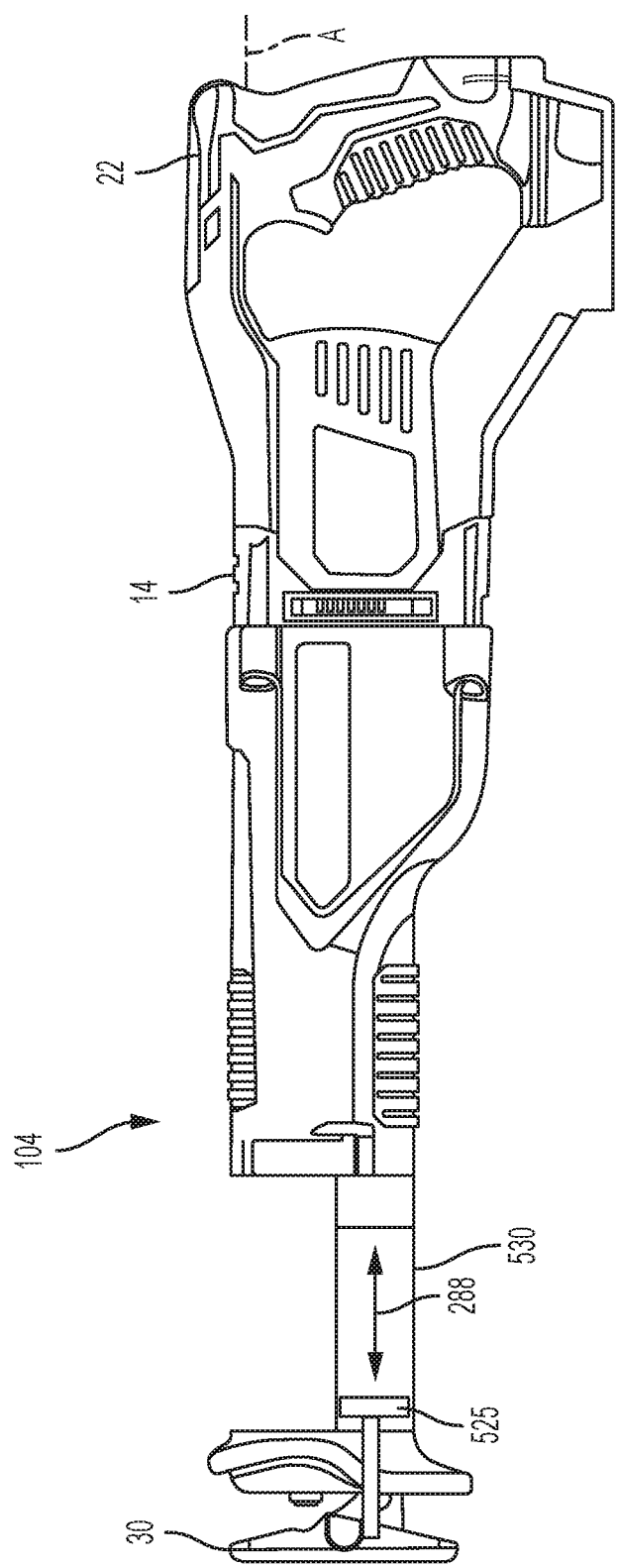

FIG. 5C illustrates the magnetically susceptible fluid 288 at the second location 510 in greater detail and with a portion of the power tool 104 cut away. A second piston 525 may be placed in a second reservoir 530 of magnetically susceptible fluid 288 in between the shoe 30 and the main body 14 of the power tool 104. In some embodiments, the second piston 525 is the sole connection between the shoe 30 and the main body 14 of the power tool 104. For example, in FIG. 5C, the second piston 525 has a first end connected to the shoe 30 and a second end in the second reservoir 530. The second reservoir 530 is then connected to the main body 14. For example, the second piston 525 and the second reservoir 530 may be coupled to an interior of the housing of the power tool 104 or to the shoe 30 using a fastener and a flange. As another example, the interior of the tool housing may include cut-outs or compartments for holding the second piston 525 and the second reservoir 530. Thus, the shoe 30 may be isolated from the main body 14 of the power tool 104 through the second reservoir 530 of magnetically susceptible fluid 288. As illustrated by the arrow in FIG. 5C, the second piston 525 may move within the second reservoir 530 along the longitudinal axis A of the power tool 104. In some embodiments, the second piston 525 may move in additional or alternate directions. For example, the second piston 525 may move vertically on an axis perpendicular to the longitudinal axis A and/or horizontally on an axis perpendicular to the longitudinal axis A (i.e., in and out of the page). Although FIG. 5C shows the second piston 525 coupled to the shoe 30 and the second reservoir 530 coupled to the main body 14, in some embodiments, the second piston 525 and the second reservoir 530 may be coupled to opposite parts of the power tool 104. In other words, in some embodiments, the second piston 525 is coupled to the main body 14 and the second reservoir 530 is coupled to the shoe 30.

Figure 5D:
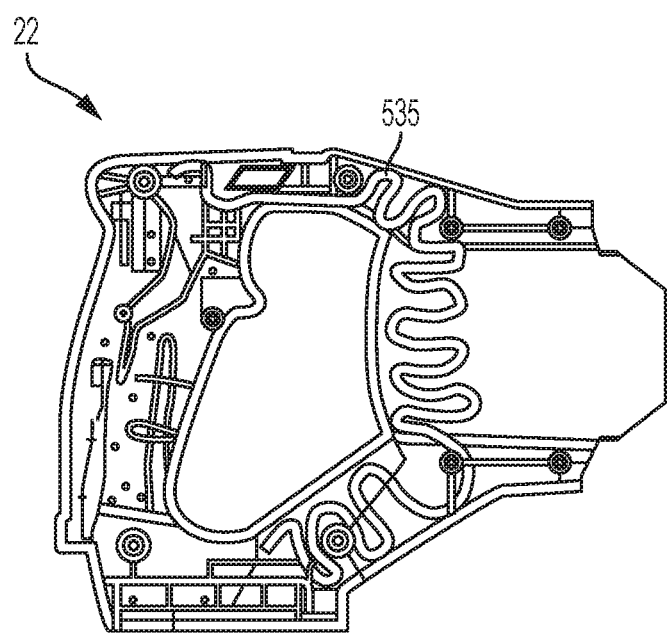

FIG. 5D illustrates a fourth location of the magnetically susceptible fluid 288 inside the power tool 104. As shown in FIG. 5D, in some embodiments, a meandering tube system 535 located within the handle assembly 22 or gear case (not shown) may include magnetically susceptible fluid 288. In other words, the meandering tube system 535 includes a tube, such as illustrated, that contains the magnetically susceptible fluid 288. In some embodiments, the meandering tube system 535 includes at least two bends where the longitudinal axis of the meandering tube changes direction. For example, as illustrated in FIG. 5D, the meandering tube system 535 includes several bends 537. In some embodiments, the meandering tube system 535 includes at least five bends, at least ten bends, at least fifteen bends, any range between two and twenty bends, or more bends. In some embodiments, the meandering tube system 535 includes a tube that has a length longer than its radius (for example, at least five, ten, fifteen, twenty five, fifty, or more times longer than its radius). In some embodiments, the meandering tube system 535 is flexible such that a person can bend or position the meandering tube system 535 within compartments in the housing of the power tool 104 as shown in FIG. 5D.

The meandering tube system 535 shown in FIG. 5D is merely exemplary. In some embodiments, the location and orientation of the meandering tube system 535 within the power tool 104 may be different. Furthermore, in some embodiments multiple meandering tube systems 535 may be used in one or more locations within the power tool 104. The meandering tube system 535 may be used with any combination of the pistons and reservoirs of magnetically susceptible fluid 288 discussed above. In other words, the power tool 104 may include both one of the piston and reservoirs embodiments as well as the meandering tube system 535, each associated with a separate inductor 185 that is separately controllable by the electronic processor 230. In some embodiments, the meandering tube system 535 may be coupled to an interior of the housing of the power tool 104 using fasteners and flanges. In some embodiments, the interior of the tool housing may include cut-outs or compartments for holding the meandering tube system 535.

The magnetically susceptible fluid 288 changes viscosity when introduced to different magnetic fields (i.e., magnetic fields of different magnitudes and/or different angles). The inductor 285 is controlled by the electronic processor 230 of the controller 226 to introduce magnetic fields of predetermined magnitude to the magnetically susceptible fluid 288 based on input signals received from the sensors 218. Such magnetic fields vary the viscosity of the magnetically susceptible fluid 288 to counteract and dissipate energy that otherwise causes vibration. Thus, the vibration experienced by the reciprocating saw 204 during operation may be reduced or dampened.

In some embodiments, an output signal from one or more of the sensors 218 may be transmitted directly to the inductor 285 to control the magnitude of the magnetic field produced by the inductor 285.

The magnetic field provided by the inductor 285 allows the vibration control of the power tool to be dynamically controlled based on a feedback signal that relates to vibration experienced by the power tool. Thus, a user can set and adjust the amount of vibration control based on a specific application or specific use of the power tool. For example, using the graphical user interface 425 on the external device 108, the user can select whether to implement the vibration control feature as well as the sensitivity of the vibration control feature.

In some embodiments, the meandering tube system 535 and the reservoirs 520 and 530 are closed circuit systems such that the magnetically susceptible fluid 288 does not enter or exit the tube or reservoirs during operation thereof.

Figure 6:
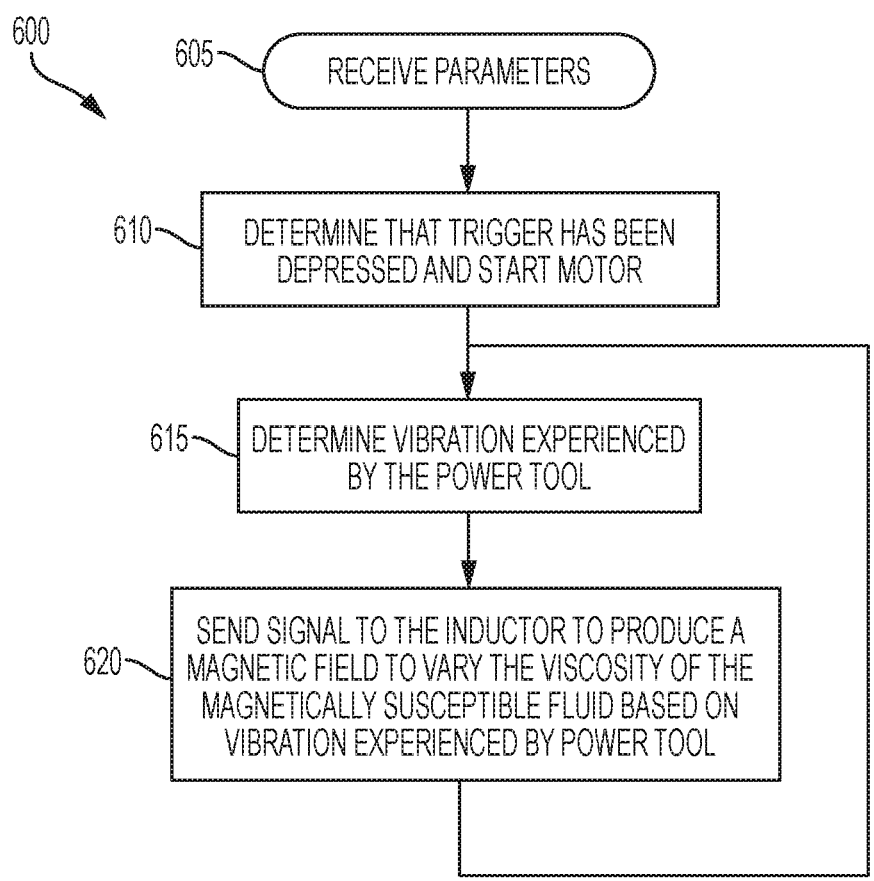
FIG. 6 illustrates a flowchart of an exemplary implementation of a vibration reduction method on the power tool.

FIG. 6 illustrates a method 600 of dynamically adjusting the vibration control of the power tool 104 according to one embodiment. At block 605, the wireless communication controller 250 receives parameters of the vibration control feature from the external device 108. In some embodiments, the parameters are received and stored on the controller 226 at the time of manufacture, rather than received via the external device 108 in the field. At block 610, the electronic processor 230 of the controller 226 determines that the trigger 212 has been depressed and starts the motor 214. At block 615, the electronic processor 230 determines the vibration experienced by the power tool 104 using signals received by at least one sensor 218. For example, the vibration sensor 218c sends a signal to the controller 226 that indicates a certain amount of vibration is being experienced by the power tool 104. At block 620, the electronic processor 230 sends a signal to the inductor 285 to produce a magnetic field to vary the viscosity of the magnetically susceptible fluid 288 based on the vibration detected by the determination of block 615.

For example, in the embodiments illustrated in FIGS. 5B and 5C (i.e., piston in a reservoir), as detected vibration levels increase, the magnetic field produced by the inductor 285 may cause the viscosity of the magnetically susceptible fluid 288 to become more or less viscous such that the magnetically susceptible fluid 288 is better able to absorb vibration experienced by the power tool 104. In other embodiments, such as the embodiment illustrated in FIG. 5D (i.e., meandering tube system), as detected vibration levels increase, the magnetic field produced by the inductor 285 may cause the viscosity of the magnetically susceptible fluid 288 to become more viscous such that the corresponding part of the power tool 104 becomes more rigid and more difficult to flex. In some embodiments, the electronic processor 230 may control the inductor 285 to provide a magnetic field to the magnetically susceptible fluid by default (for example, when no vibration is detected or vibration is below a low threshold). In some embodiments, by default, the electronic processor 230 controls the inductor 285 to not produce a magnetic field (for example, as shown in FIG. 7A), to produce some magnetic field (for example, as shown in FIG. 7B, or to produce a stronger magnetic field (for example, as shown in FIG. 7C). Applying a magnetic field by default such as shown in FIG. 7B allows the viscosity of the magnetically susceptible fluid to be adjusted to be more viscous (for example, as shown in FIG. 7C) or less viscous (for example, as shown in FIG. 7A) by increasing or decreasing the strength of the magnetic field, respectively.

In some embodiments, the electronic processor 230 sends a signal to the inductor 285 that is proportional to the signal received from the vibration sensor 218c. In such embodiments, as the vibration experienced by the power tool 104 increases, the viscosity of the magnetically susceptible fluid 288 increases or decreases by a proportionate amount when the magnetically susceptible fluid 288 is located in a reservoir that houses a piston, and increases by a proportionate amount when the magnetically susceptible fluid 288 is located in a meandering tube system.

The specified sensitivity (e.g., set via the graphical user interface 425) may adjust a vibration threshold that indicates the vibration level to be experienced by the power tool 104 before the inductor 285 is controlled to dampen vibration. Additionally, the specified sensitivity may adjust the aggressiveness of the dampening control (i.e., the relationship between the vibration experienced by the power tool 104 and the control signal sent to the inductor 285 from the electronic processor 230). In some embodiments, the specified sensitivity can adjust both the vibration threshold and the aggressiveness of the dampening control. Furthermore, in some embodiments, the graphical user interface 425 may have a separate sensitivity parameter for each of the vibration threshold and the aggressiveness of the dampening control. As shown in FIG. 6, after the electronic processor 230 sends the signal to the inductor 285, the method 600 proceeds back to block 615 to continue determining the vibration experienced by the power tool 104. Thus, the magnetic field produced by the inductor 285, and, in turn, the viscosity of the magnetically susceptible fluid 288, is varied depending on the amount of vibration experienced by the power tool 104.

Thus, the invention provides, among other things, a power tool with a dynamic vibration reduction feature that varies based on the vibration experienced by the power tool.

We claim:

1. A method of reducing vibration experienced by a power tool, the method comprising:
   receiving, by an electronic controller and from an external device via a wireless communication controller of the power tool, a user-selected sensitivity level for vibration control, wherein the sensitivity level is set by a user via a graphical user interface of the external device, and wherein the sensitivity level controls (i) a vibration threshold that indicates a vibration level to be experienced by the power tool before an inductor is controlled to provide the vibration control and (ii) an aggressiveness of the vibration control, wherein the electronic controller includes a memory and an electronic processor;
   controlling a motor to produce an output, the motor including a rotor and a stator, the rotor being configured to produce the output;
   generating, with a sensor, an input signal indicating an amount of vibration experienced by the power tool;
   receiving, with the electronic controller and from the sensor, the input signal;
   determining a value for the amount of vibration experienced by the power tool based on the input signal;
   determining whether the value for the amount of vibration experienced by the power tool is less than the vibration threshold;
   generating, with the electronic controller and in response to the value for the amount of vibration experienced by the power tool being equal to or greater than the vibration threshold, a control signal for the inductor based on the input signal and the sensitivity level to control a magnetic field to provide the vibration control;
   transmitting the control signal from the electronic controller to the inductor; and
   introducing the magnetic field, with the inductor based on the control signal, to a magnetically susceptible fluid located within a housing of the power tool.

2. The method of claim 1, wherein introducing the magnetic field, with the inductor based on the control signal, to the magnetically susceptible fluid includes introducing the magnetic field to a reservoir holding the magnetically susceptible fluid, the reservoir including a first end of a piston located in the reservoir, the reservoir and a second end of the piston being coupled between a handle assembly of the power tool and a main body of the power tool.

3. The method of claim 1, wherein introducing the magnetic field, with the inductor based on the control signal, to the magnetically susceptible fluid includes introducing the magnetic field to a reservoir holding the magnetically susceptible fluid, the reservoir including a first end of a piston located in the reservoir, the reservoir and a second end of the piston being coupled between a shoe of the power tool and a main body of the power tool.

4. The method of claim 1, wherein introducing the magnetic field, with the inductor based on the control signal, to the magnetically susceptible fluid includes introducing the magnetic field to a meandering tube system holding the magnetically susceptible fluid, the meandering tube system being located within at least one of the group consisting of a handle assembly of the power tool and a gear case of the power tool.

5. The method of claim 1, wherein introducing the magnetic field, with the inductor based on the control signal, to the magnetically susceptible fluid includes introducing the magnetic field such that the magnetically susceptible fluid becomes more viscous.

6. The method of claim 1, wherein the power tool is one of the group consisting of a reciprocating saw, an impact driver, an impact wrench, and a rotary hammer.

7. A communication system comprising:
   an external device including a first wireless communication controller and a display, wherein the display is configured to receive a selection of a sensitivity level of vibration control of a power tool and wherein the first wireless communication controller includes a first antenna, wherein the sensitivity level is set by a user via a graphical user interface of the external device, and wherein the sensitivity level controls (i) a vibration threshold that indicates a vibration level to be experienced by the power tool before the inductor is controlled to provide the vibration control and (ii) an aggressiveness of the vibration control;
   the power tool including
      a second wireless communication controller configured to receive the sensitivity level from the first wireless communication controller, wherein the second wireless communication controller includes a second antenna;

a housing;

a motor within the housing, wherein the motor includes a rotor and a stator and the rotor is configured to produce an output;

a magnetically susceptible fluid located within the housing;

an inductor within the housing and configured to introduce a magnetic field to the magnetically susceptible fluid to provide the vibration control;

a sensor configured to determine an amount of vibration experienced by the power tool;

an electronic controller including a memory and an electronic processor, the electronic controller coupled to the sensor and to the inductor, the electronic controller configured to:

receive, from the external device via the second wireless communication controller, the sensitivity level for the vibration control, control the motor to produce the output, receive an input signal from the sensor indicating the amount of vibration experienced by the power tool, determine a value for the amount of vibration experienced by the power tool based on the input signal, determine whether the value for the amount of vibration experienced by the power tool is less than the vibration threshold, generate, in response to the value for the amount of vibration experienced by the power tool being equal to or greater than the vibration threshold, a control signal for the inductor based on the input signal and the sensitivity level to control the magnetic field to provide vibration control, and provide the control signal to the inductor to control the magnetic field to provide the vibration control; and at least one of the group consisting of:

a first piston including a first end located in a first reservoir that holds the magnetically susceptible fluid, wherein the first reservoir and a second end of the first piston are coupled between a handle assembly of the power tool and a main body of the power tool;

a second piston including a first end located in a second reservoir that holds the magnetically susceptible fluid, wherein the second reservoir and a second end of the second piston are coupled between a shoe of the power tool and the main body of the power tool; and a meandering tube system that holds the magnetically susceptible fluid, wherein the meandering tube system is located within at least one of the group consisting of the handle assembly of the power tool and a gear case of the power tool.

* * * * *